United States Patent
Wirth et al.

[15] 3,674,837
[45] July 4, 1972

[54] POLYESTERS WHICH CONTAIN HYDROXYL AND CARBON AMIDE GROUPS

[72] Inventors: Wolf-Dieter Wirth, Cologne, Stammheim; Erwin Müller, Leverkusen, both of Germany

[73] Assignee: Farbenfabriken Bayer Aktiengesellschaft, Leverkusen, Germany

[22] Filed: July 8, 1970

[21] Appl. No.: 53,280

[30] Foreign Application Priority Data

July 11, 1969 Germany .....................P 19 35 290.0

[52] U.S. Cl. ....................260/482 R, 260/468 R, 260/471 A
[51] Int. Cl.......................................................C07c 101/26
[58] Field of Search............260/482 R, 482 C, 468 R, 468 C, 260/471 R, 471 A

[56] References Cited

UNITED STATES PATENTS 3,579,482   5/1971   Brotherton et al.....................260/482

*Primary Examiner*—Lorraine A. Weinberger
*Assistant Examiner*—Paul J. Killos
*Attorney*—Robert A. Gerlach and Sylvia Gosztonyi

[57] ABSTRACT

Polyesters which contain hydroxyl and carbonamide groups are prepared by copolymerizing a lactone with a lactam in the presence of a low molecular weight initiator which contains at least two active hydrogen atoms at a temperature of from about 50° C. to about 300° C. These polyesters are particularly useful as plasticizers and stabilizers for polyvinyl chloride.

8 Claims, No Drawings

POLYESTERS WHICH CONTAIN HYDROXYL AND CARBON AMIDE GROUPS

This invention relates to polyesters and a method for their preparation and more particularly to polyesters formed from the copolymerization of lactones with lactams.

That lactones can be polymerized in the presence of active hydrogen containing compounds, such as, for example polyhydric alcohols, amines or amino-alcohols, hydrazines and the like to prepare polyesters, is well known in the art.

Thus, for example, it is known to polymerize γ-butyro-lactone or δ-valerolactone in the presence of both a polyhydric alcohol using sulphuric acid as a catalyst at temperatures between 190° C. and 200° C. to produce polyesters which have carboxyl end groups. It is also known that δ-valerolactone, i.e. a lactone which has five carbon atoms in the lactone ring, can be polymerized without the addition of a catalyst in the presence of a polyhydric alcohol over a sufficiently long period of time (about 10 hours) at temperatures above 150° C. German Auslegeschriften 1,206,586; 1,213,995 and 1,209,245 teach the polymerization of lactones having six carbon atoms in the lactone ring in the presence of organic compounds which have several active hydrogen atoms, such as, for example polyhydric alcohols or amines, at a reaction rate which is sufficiently high for practical purposes but which can only be achieved in the presence of catalysts.

It is therefore an object of this invention to provide a method for the production of polyesters by the polymerization of lactones which are devoid of the deficiencies of the prior art. Another object of this invention is to provide novel polyesters produced by the polymerization of lactones. A further object of this invention is to provide a method for the production of polyesters by the polymerization of lactones without the need of a catalyst.

The foregoing objects and others which will become apparent from the following description are accomplished in accordance with the invention generally speaking by copolymerizing a lactone with a lactam as comonomer in the presence of an initiator compound which contains at least two active hydrogen atoms to prepare polyesters which contain hydroxyl and carbon-amide groups.

Thus the invention contemplates polyesters which contain hydroxyl and carbonamide groups and a method for their preparation which comprises heating at a temperature of from about 50° C. to about 300° C., preferably from about 130° C. to about 220° C., in the presence of a low molecular weight initiator which contains at least two active hydrogen atoms, lactones having the general formula

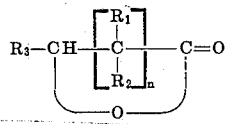

wherein
R₁ and R₂, are the same or different and represent hydrogen atoms, $C_1$ to $C_4$ alkyl radicals, $C_6$ to $C_{12}$ cycloalkyl radicals, $C_1$ to $C_4$ alkoxy radicals or $C_6$ to $C_{12}$ aryl radicals, which may be substituted, in which n+2 of the radicals are hydrogen atoms;
R₃ is a hydrogen atom or a $C_1$ or $C_4$ alkyl radical; and
n is an integer of 4 to 6 and lactams having the general formula

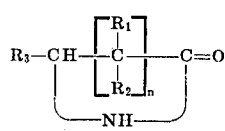

wherein R₁, R₂, R₃ and n have the meanings given above.
ε-Caprolactone and substituted ε-caprolactones are particularly suitable as starting materials in the process of the invention.

Some particularly preferred substituted ε-caprolactones are for example, the various monoalkyl-ε-caprolactones such as, monomethyl-, monoethyl-, monopropyl-, monoisopropyl-, monobutyl-ε-caprolactones and the like; dialkyl-ε-caprolactones in which the two alkyl groups may be attached to the same or different carbon atoms but not both to the ε-carbon atom such as, for example, dimethyl-, diethyl-, dibutyl-ε-caprolactones and the like; trialkyl-ε-caprolactones in which three carbon atoms are substituted in the lactone ring provided that the ε-carbon atom is not substituted, such as, for example trimethyl-, triethyl-, tributyl-ε-caprolactones and the like; alkoxy-ε-caprolactones, such as, for example methoxy-, ethoxy-, butoxy-ε-caprolactones and the like; cycloalkyl- and aryl-ε-caprolactones having $C_6$ to $C_{12}$ cycloalkyl or $C_6$ to $C_{12}$ aryl radicals, such as, for example cyclohexyl- and phenyl-caprolactones, and the like. Suitable lactones which have more than six carbon atoms in the ring are for example, ε-oenantholactone, η-caprylolactone, and the like.

Some lactams suitable for use according to the invention are, for example, the various monoalkyl-ε-caprolactams, such as mono-methyl-, monoethyl-, monopropyl-, monobutyl-ε-caprolactams and the like; dialkyl-ε-caprolactams in which the two alkyl groups are situated on the same or different carbon atoms but not both on the ε-carbon atom, such as, for example dimethyl-, diethyl-, dibutyl-ε-caprolactams and the like; trialkyl-ε-caprolactams in which three carbon atoms are substituted in the lactam provided that the ε-carbon atom is not disubstituted, such as, for example trimethyl-, triethyl-, tributyl-ε-caprolactams, and the like; alkoxy-ε-caprolactams, such as, for example methoxy-, ethoxy-, butoxy-ε-caprolactam, and the like; cycloalkyl- and aryl-ε-caprolactam having $C_6$ to $C_{12}$ cycloalkyl or $C_6$ to $C_{12}$ aryl radicals, such as, for example cyclohexyl- and phenyl- caprolactam, and the like. Suitable lactams having more than six carbon atoms in the ring are, for example, ε-oenantholactam, η-caprylolactam, and the like.

Suitable initiator compounds which are contemplated for the use in the process according to the invention are polyols, diamines or aminoalcohols having a molecular weight of 32 – 500, preferably 32 – 100, such as, for example, ethylene glycol, propylene glycol, butane-1,4-diol, pentane-1,5-diol, hexane-1,3-diol, hexane-1,6-diol, glycerol, 1,1,1-trimethylolpropane, 1,1,1-trimethylolethane, diethylene glycol, hexane-1,2,6-triol, 4,4'-dihydroxydiphenyl-dimethyl-methane, pentaery-thritol, triethylene glycol, 2,2 dimethyl-propane-1,3-diol, sorbitol, ethylene diamine, propylene diamine, butylene diamine, pentamethylene diamine, hexamethylene diamine, phenylene-diamine, xylylenediamine, diaminodiphenyl methane, diamino napthylene, aminoethanol, aminopropanol, aminobutanol and the like.

Particularly preferred initiators are hydrazines and hydrazine derivatives having the general formula

wherein
R and R' are the same or different and represent hydrogen atoms, $C_1$ to $C_4$ alkyl radicals, $C_1$ to $C_4$ hydroxyalkyl radicals, allyl radicals, cyanoethyl radicals, substituted or unsubstituted $C_6$ to $C_{12}$ aryl radicals or heterocyclic radicals.

Suitable compounds corresponding to the above formula are, for example, hydrazine, methylhydrazine, ethylhydrazine, propylhydrazine, butylhydrazine, N,N' dimethyl hydrazine, N,N' diethyl hydrazine, N-methyl-N'-ethyl hydrazine, N-methyl N'-propyl hydrazine, hydroxymethyl hydrazine, hydroxy ethyl hydrazine, hydroxypropyl hydrazine, N,N' dihydroxydimethyl hydrazine, allyl hydrazine, N,N' diallyl hydrazine, propenyl hydrazine, isopropenyl hydrazine, phenyl hydrazine, N,N' diphenyl hydrazine, napthyl hydrazine, tolyl hydrazine and the like.

The amount of lactam used in the process according to the invention is from about 10 percent to about 30 percent by weight, preferably about 20 percent by weight, of the quantity of lactone used.

Since theoretically one molecule of one of the above-mentioned initiator compounds is sufficient to initiate polymerization of an unlimited number of lactone and lactam molecules, the quantity of initiator used in proportion to the quantity of lactone and lactam may be very small. On the other hand, the molecular weight of the polyester can be predetermined by the proportion of initiator to the quantity of lactone and lactam. Thus the molecular weight of the final product increases with increasing lactone resp. lactam/initiator-ratio and vice versa. The quantity of initiators used is generally from about 0.5 to about 5 percent by weight, preferably from about 1 to about 3 percent by weight, based on the weight of reaction mixture.

The process according to the invention is carried out at temperatures of between about 50° C. and about 300° C., preferably between about 130° C. and about 220° C.

The progress of polymerization can be followed by determining the OH-number or the refractive index. The reaction may be regarded as complete as soon as the OH-number or the refractive index remains constant, the refractive index of the final product being always higher than the refractive index of the mixture of starting materials.

If a polyester of pale color is to be produced, the reaction is preferably carried out in the absence of oxygen. This is achieved, for example, by operating under a slight vacuum or by passing an inert gas, such as, for example nitrogen, over the reaction mixture. After polymerization is complete any unreacted monomers present may be removed under reduced pressure, for example, from about 1 to about 5 mm Hg, and heating, for example, at a temperature of from about 120° C. to about 220° C.

The polyesters produced by the process of the invention normally have a molecular weight of between about 300 and about 20,000 preferably between about 500 and about 12,000 and have a hydroxyl number between about 50 and about 350 and an acid number of up to about 10 but preferably below about 2.

The polyesters produced by the process of the invention find particular utility as plasticizers and stabilizers for polyvinyl chloride, and are generally useful as precursors in the manufacture of polyurethane plastics.

The invention is further illustrated but it is not intended that it be limited by the following examples in which all parts are by weight unless otherwise specified.

General Method of Procedure

A mixture of lactone and lactam is mixed by stirring with the initiator at room temperature and heated to the given reaction temperature while nitrogen is passed over the reaction mixture. After the end of the reaction, any unreacted monomers still present are removed under a reduced pressure of from about 1 to about 5 mm Hg, and heating at a temperature of from about 120° C. to about 220° C.

EXAMPLE 1

| Lactone | About 31.01 parts of ε-caprolactone |
| --- | --- |
| Lactam | About 7.75 parts of ε-caprolactam |
| Initiator | About 1.24 parts of ethylene glycol (molecular weight 62) |
| Reaction time | About 20 hours |
| Reaction temperature | About 220° C. |
| Properties of the polyester | |
| Hydroxyl number | 56 |
| Acid number | 2.3 |
| Softening point | 40° to 41° C. |

EXAMPLE 2

| Lactone | About 31.264 parts of ε-caprolactone |
| --- | --- |
| Lactam | About 7.816 parts of ε-caprolactam |
| Initiator | About 0.92 parts of methyl hydrazine (molecular weight 46) |
| Reaction time | About 20 hours |
| Reaction temperature | About 220° C. |
| Properties of the polyester | |
| Hydroxyl number | 60.9 |
| Acid number | 6.2 |
| Softening point | 39° to 40° C. |

EXAMPLE 3

| Lactone | About 2361 parts of ε-caprolactone |
| --- | --- |
| Lactam | About 590 parts of ε-caprolactam |
| Initiator | About 48 parts of hydrazine (molecular weight 32) |
| Reaction time | About 12 hours |
| Reaction temperature | About 220° C. |
| Properties of the polyester | |
| Hydroxyl number | 71.4 |
| Acid number | 9.6 |
| Softening point | 40° to 42° C. |

It is to be understood that any of the components and conditions mentioned as suitable herein can be substituted for its counterpart in the foregoing examples and that although the invention has been described in considerable detail in the foregoing, such detail is solely for the purpose of illustration and that variations can be made in the invention by those skilled in the art without departing from the spirit and scope of the invention.

What is claimed is:

1. A process for the preparation of polyesters which contain hydroxyl and carbonamide groups which comprises heating at a temperature of from about 50° C. to about 300° C., a lactone having the general formula

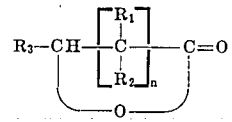

wherein $R_1$ and $R_2$ are the same or different and represent hydrogen atoms, $C_1$ to $C_4$ alkyl radicals, $C_6$ to $C_{12}$ cycloalkyl radicals, $C_1$ to $C_4$ alkoxy radicals or $C_6$ to $C_{12}$ aryl radicals in which $n+2$ of the radicals represent hydrogen atoms;

$R_3$ represents a hydrogen atom or a $C_1$ to $C_4$ alkyl radical; and $n$ represents an integer of 4 to 6 and a lactam having the general formula

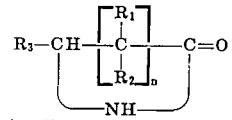

wherein $R_1$, $R_2$, $R_3$ and $n$ have the meanings given above; in the presence of a low molecular weight initiator compound which contains at least two active hydrogen atoms.

2. The process of claim 1, wherein the lactone is ε-caprolactone.

3. The process of claim 1 wherein the lactam is ε-caprolactam.

4. The process of claim 1 wherein the initiator compound is hydrazine or a hydrazine derivative having the general formula $$R-HN-NH-R'$$

wherein

R and R' are the same or different and represent hydrogen atoms, $C_1$ to $C_4$ alkyl radicals, $C_1$ to $C_4$ hydroxyalkyl radicals, allyl radicals, cyanoethyl radicals, substituted or unsubstituted $C_6$ to $C_{12}$ aryl radicals or heterocyclic radicals.

5. The process of claim 1 wherein the lactam is present in an amount of from about 10 percent to about 30 percent by weight based on the weight of lactone.

6. The process of claim 1 wherein the initiator is used in an amount of from about 0.5 percent to about 5 percent by weight based on the weight of reaction mixture.

7. The process of claim 1 wherein the temperature is from about 130° C. to about 220° C.

8. Polyesters which contain hydroxyl and carbonamide groups prepared by the process of claim 1.

* * * * *